(12) United States Patent
Aoki

(10) Patent No.: US 6,985,638 B1
(45) Date of Patent: Jan. 10, 2006

(54) EFFICIENT PERSPECTIVE TRANSFORMATION OF PARTIAL IMAGES IN COMPOSING A SINGLE IMAGE

(76) Inventor: Shin Aoki, 4-15-1-201, Utsukushigaoka, Aoba-ku, Yokohama-shi, Kanagawa (JP)

( * ) Notice: Subject to any disclaimer, the term of this patent is extended or adjusted under 35 U.S.C. 154(b) by 819 days.

(21) Appl. No.: 09/584,254

(22) Filed: May 31, 2000

(30) Foreign Application Priority Data

Jun. 1, 1999 (JP) .......................... 11-154119

(51) Int. Cl.
G06K 9/36 (2006.01)
G09G 5/00 (2006.01)

(52) U.S. Cl. ....................... 382/284; 345/645
(58) Field of Classification Search ........... 382/284, 382/154, 162, 164, 173, 190, 209, 216, 254, 382/240, 276, 278, 282, 289, 291, 295, 296, 382/299, 304; 345/629, 645, 648, 672; 348/36, 348/42, 95
See application file for complete search history.

(56) References Cited

U.S. PATENT DOCUMENTS

| | | | | |
|---|---|---|---|---|
| 5,448,654 A | * | 9/1995 | Katayama et al. | 382/298 |
| 5,610,658 A | * | 3/1997 | Uchida et al. | 348/416 |
| 5,611,000 A | * | 3/1997 | Szeliski et al. | 382/294 |
| 5,963,664 A | * | 10/1999 | Kumar et al. | 382/154 |
| 5,982,951 A | * | 11/1999 | Katayama et al. | 382/284 |
| 5,987,164 A | * | 11/1999 | Szeliski et al. | 382/154 |
| 6,075,905 A | * | 6/2000 | Herman et al. | 382/284 |
| 6,078,701 A | * | 6/2000 | Hsu et al. | 382/294 |
| 6,157,747 A | * | 12/2000 | Szeliski et al. | 382/284 |
| 6,249,616 B1 | * | 6/2001 | Hashimoto | 382/284 |

FOREIGN PATENT DOCUMENTS

JP    HEI 8-116490    3/1996

OTHER PUBLICATIONS

Video Mosaics for Virtual Environment, by Richard Szeliski, IEEE Computer Graphics and Applications, pp. 22–30, Mar. (1996).

* cited by examiner

Primary Examiner—Kanji Patel

(57) ABSTRACT

To compose an image from a plurality of partially overlapping images, both positional movement and perspective transformation are performed using pyramidal data structures. After the positional movement is determined for a unit block of one partially overlapping image to match a corresponding block, a set of perspective transformation parameters is determined based upon the positional movement. The partially overlapping images are composed into a single image while the partially overlapping images efficiently undergo the perspective transformation according to the above determined parameters.

27 Claims, 8 Drawing Sheets

BLACK LINE IMAGE ON WHITE BACKGROUND

WHITE LINE IMAGE ON BLACK BACKGROUND

OTHER GENERAL IMAGES

EFFICIENT PERSPECTIVE TRANSFORMATION OF PARTIAL IMAGES IN COMPOSING A SINGLE IMAGE

FIELD OF THE INVENTION

The current invention is generally related to composing an image, and more particularly related to the determination of perspective transformation parameters based upon the amount of movement to match overlapping image portions.

BACKGROUND OF THE INVENTION

In order to increase the resolution in capturing a large object, a plurality of overlapping partial images are taken and are composed into a single image. In the process of composing the overlapping partial images, one exemplary prior art reference, Hei 8-116490 discloses a system for taking a plurality of partially overlapping images with a predetermined number of cameras. The plurality of the images is corrected for their distortion and parallax. The corrected images are moved and rotated so that they are composed into a single image. However, it is impossible to perfectly match these partially overlapping images by moving and rotating since the direction of the image plane for these images is not identical when these images have been taken by an ordinary camera. In order to match the partially overlapping images without any disparity, it is necessary to perform perspective transformation on the images. The relation between a point on two image planes is as follows in Equation [1]:

$$\begin{bmatrix} x1 \\ y1 \end{bmatrix} = \begin{bmatrix} \frac{c0x0 + c1y0 + c2}{c6x0 + c7y0 + 1} \\ \frac{c3x0 + c4y0 + c5}{c6x0 + c7y0 + 1} \end{bmatrix} \quad [1]$$

where the two points are (x0, y0) and (x1, y1) and c0 through c7 are variable parameters.

One prior attempt to use the above Equation [1] is "Video Mosaics for Virtual Environments" by Richard Szeliski, IEEE Computer Graphics and Applications, pp 22–30, March (1996). Without dividing an image into blocks, pixel values of two partially overlapping images are compared for a difference, and the parameters c0 through c7 of the Equation [1] are repeatedly evaluated by minimizing the difference. However, since the parameter value changes are determined by "yamanobori" based upon intensity gradient, depending upon the initialization of the parameter values, an erroneous minimization of the pixel value difference may follow. Thus, the correct solution is not necessarily obtained. Furthermore, when the light intensity is not uniform on an image, the above described minimal pixel value difference method cannot accommodate the light intensity variations. For example, a central portion of an image has less light intensity than its edge portions. Another example is that the light intensity of the image depends upon an angle of an image-capturing device, the location within the image or an automatic exposure function. Although, one way to improve the above problem is to reiterate non-linear optimized calculation, it is difficult to determine certain coefficients for the calculation and it is also time consuming to process the calculation.

Because of the above described difficulties, it has remained desired to improve a method of composing a single image from partially overlapping images that have been taken by a common image-capturing device.

SUMMARY OF THE INVENTION

In order to solve the above and other problems, according to a first aspect of the current invention, a method of composing partially overlapping images, including: inputting partially overlapping images of at least a common object; dividing at least two of the overlapping images into a predetermined number of blocks; determining a positional relation between a corresponding pair of the blocks in the two overlapping images; determining a perspective transformation parameter based upon the positional relation; and composing the overlapping images according to perspective transformation based upon the perspective transformation parameter.

According to a second aspect of the current invention, a system for composing partially overlapping images, including: an image input unit for inputting partially overlapping images of at least a common object; a block dividing unit connected to the image input unit for dividing at least two of the overlapping images into a predetermined number of blocks; a positional relation determination unit connected to the block dividing unit for determining a positional relation between a corresponding pair of the blocks in the two overlapping images; a perspective transformation parameter determination unit connected to the positional relation determination unit for determining a perspective transformation parameter based upon the positional relation; and a composing unit connected to the perspective transformation parameter determination unit for composing the overlapping images according to perspective transformation based upon the perspective transformation parameter.

According to a third aspect of the current invention, storage medium storing computer executable instructions for composing partially overlapping images, the computer executable instructions performing the steps of: inputting partially overlapping images of at least a common object; dividing at least two of the overlapping images into a predetermined number of blocks; determining a positional relation between a corresponding pair of the blocks in the two overlapping images; determining a perspective transformation parameter based upon the positional relation; and composing the overlapping images according to perspective transformation based upon the perspective transformation parameter.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
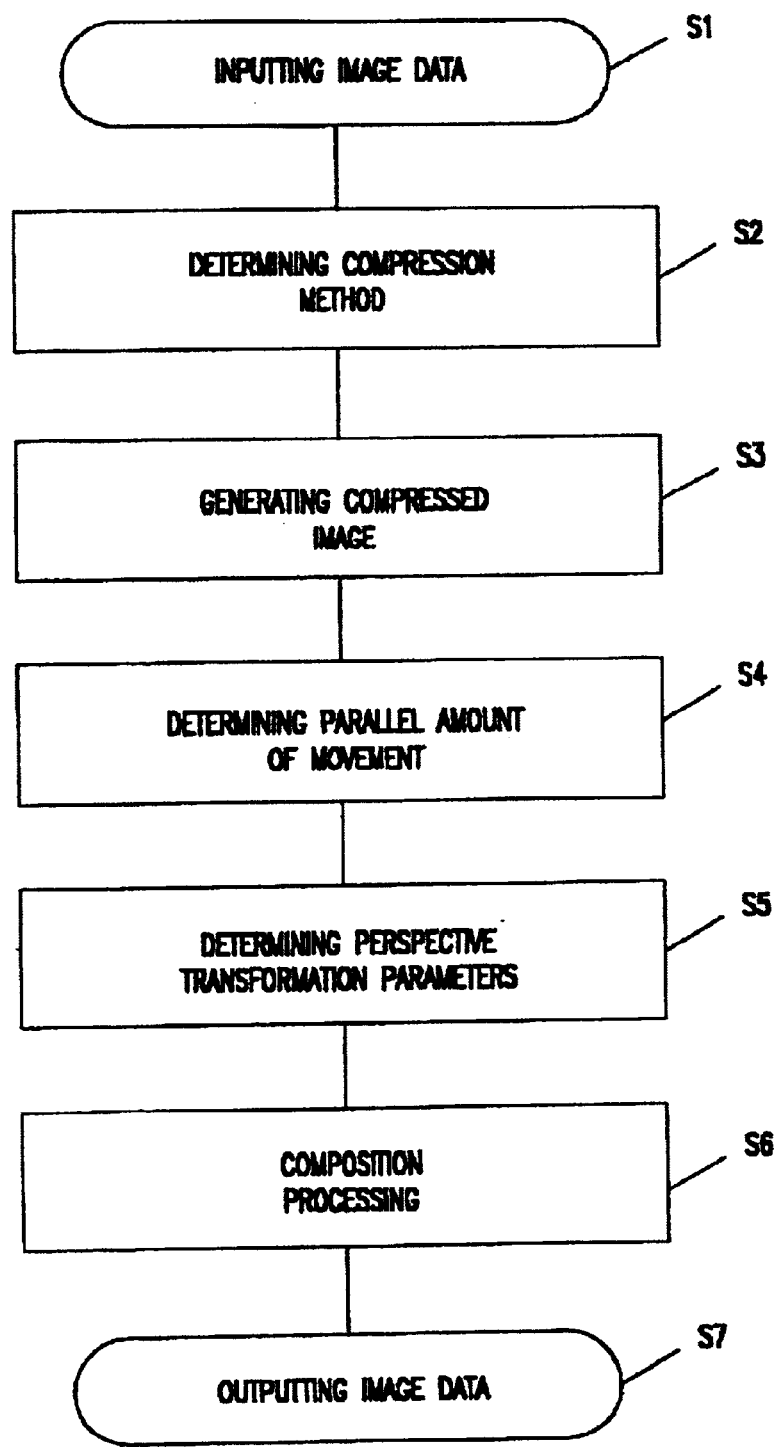
FIG. 1 is a general flow chart illustrating steps or acts involved in one preferred process of composing a single image from partially overlapping images according to the current invention.

Referring now to the drawings, wherein like reference numerals designate corresponding structures throughout the views, and referring in particular to FIG. 1, one preferred process of composing a single image from partially overlapping images according to the current invention is illustrated in a general flow chart which includes the following steps or acts. A plurality of partially overlapping images is inputted in step S1. These images containing at least a common object are taken from a number of positions by an image-capturing device such as a digital camera or an image scanner. Based upon the inputted images, a criterion is selected from a predetermined set of criteria to compress or reduce the image into a series of low-resolution images in step S2. Using the selected criterion, a series of the low-resolution reduced images are generated from the originally inputted images in step S3. Using the series of reduced low-resolution images, an amount of necessary parallel movement is determined so that the partially overlapping images match when they are composed into a single image in step S4. If each of the partially overlapping images is divided into a predetermined number of blocks, the necessary parallel movement for each block is determined. The above determined parallel movement amounts are now used to determine perspective transformation parameters in step S5. Finally, the partially overlapping images are composed into a single image while they undergo perspective transformation according to the above determined perspective transformation parameters in step S6. The composed image is then outputted in step S7.

Figure 2:
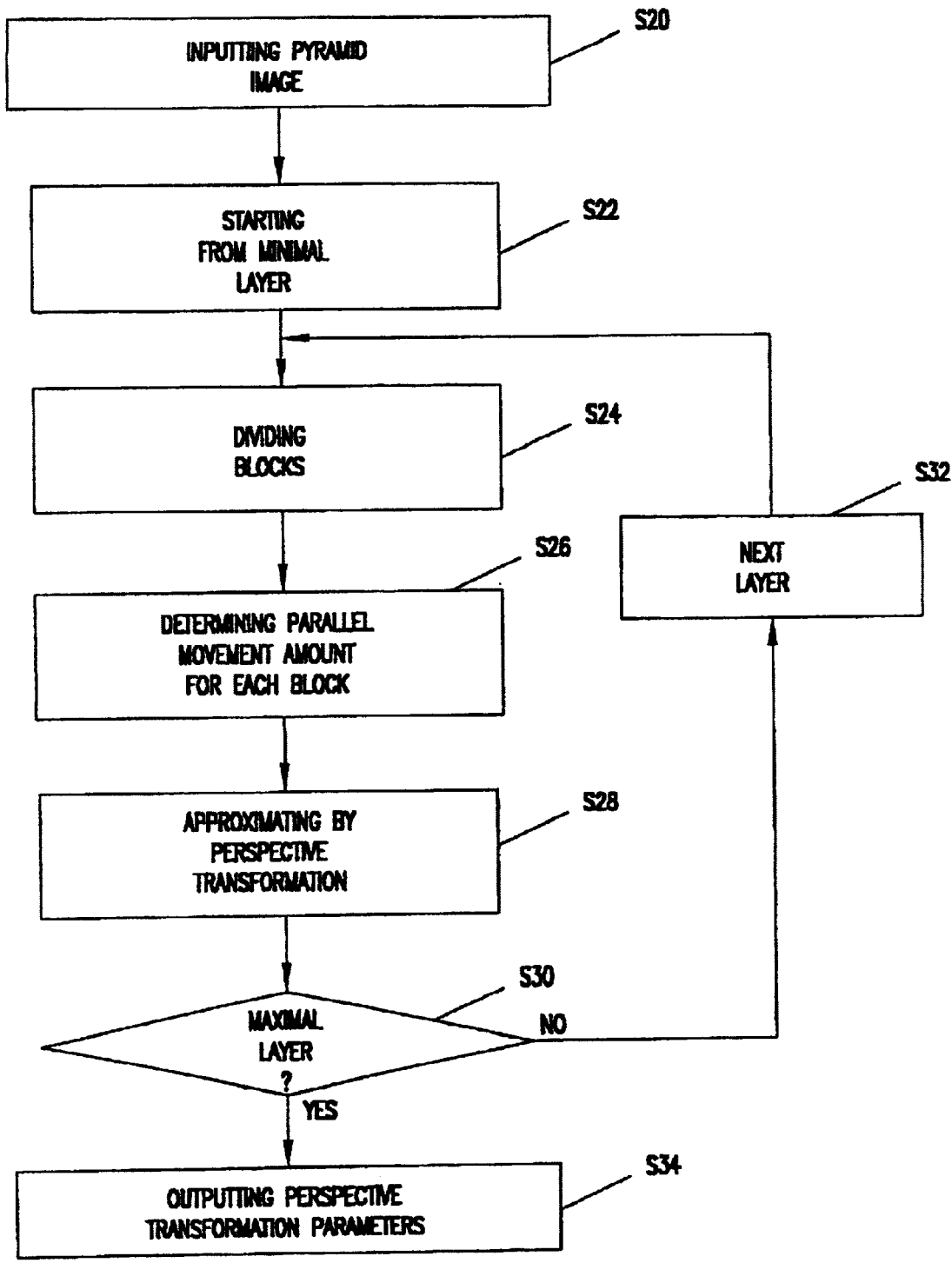
FIG. 2 is a detailed flow chart illustrating some of steps or acts involved in the preferred process of composing a single image from partially overlapping images according to the current invention.

Now referring to FIG. 2, the above described preferred process of composing a single image from partially overlapping images according to the current invention is illustrated in a detailed flow chart which includes the following steps or acts. The following acts or steps may parallel the steps S3 through S5 of the preferred process as described in FIG. 1. In step 20, layers of sequentially low-resolution images are generated, and these images are organized into a pyramidal data structure as will be fully described with respect to FIG. 3. In general, the pyramidal data structure includes at least a minimal or top layer where the resolution of the reduced image is the lowest and a maximal or bottom layer where the resolution is the highest. The preferred process starts with the minimal layer in step S22. A current layer is now divided into a predetermined number of blocks in step S24. Each block is now considered to determine an amount of parallel movement necessary to match the block with an adjacent block in step S26. Based upon the above determined amount of parallel movement for each block, perspective transformation parameters are approximated in step S28. Upon completing the perspective transformation parameter approximation, it is determined whether or not the current layer is the maximal layer in the pyramidal data structure. If it is not, the next layer towards the maximal layer is selected in step S32, and the steps 24 through 30 are repeated. On the other hand, the current layer is indeed the maximal layer, the approximated transformation parameters are outputted in step S34.

Figure 3:
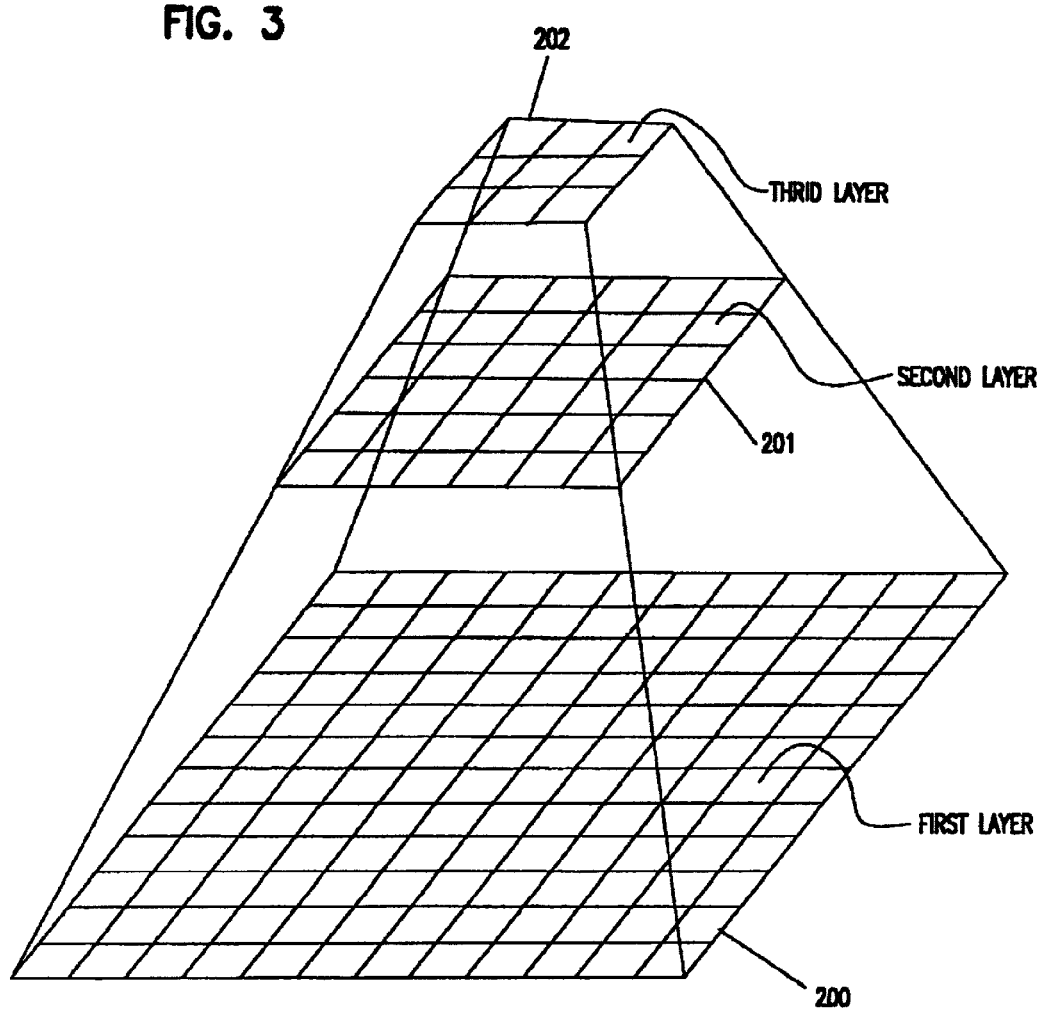
FIG. 3 is a diagram illustrating an exemplary pyramidal data structure in a three dimensional figure.

Now referring to FIG. 3, an exemplary pyramidal data structure is illustrated in a three dimensional figure. Although only three layers are illustrated to simplify the data structure, the pyramidal data structure used in the current invention is not limited to any number of layers. Furthermore, the reduction rate is also not limited to any particular rate, and it does not have to be equal for the two sides. Each layer represents a certain image characteristics such as a gray scale value or a color component value. The three layers include a maximal or first layer 200, a middle or a second layer 201 and a minimal or third layer 202. To construct the pyramidal data structure, the second layer 201 is generated from the inputted image or maximal layer 200 by reducing a 4 pixel-by-4 pixel area into a 2 pixel-by-2 pixel area. Similarly, the third layer 202 is generated from the middle layer 201 by reducing a 4 pixel-by-4 pixel area into a 2 pixel-by-2 pixel area. Because of the resolution level, the data in the third layer 202 is less closely approximated than that in the second layer 201 with respect to the original image layer 200.

Figure 4:
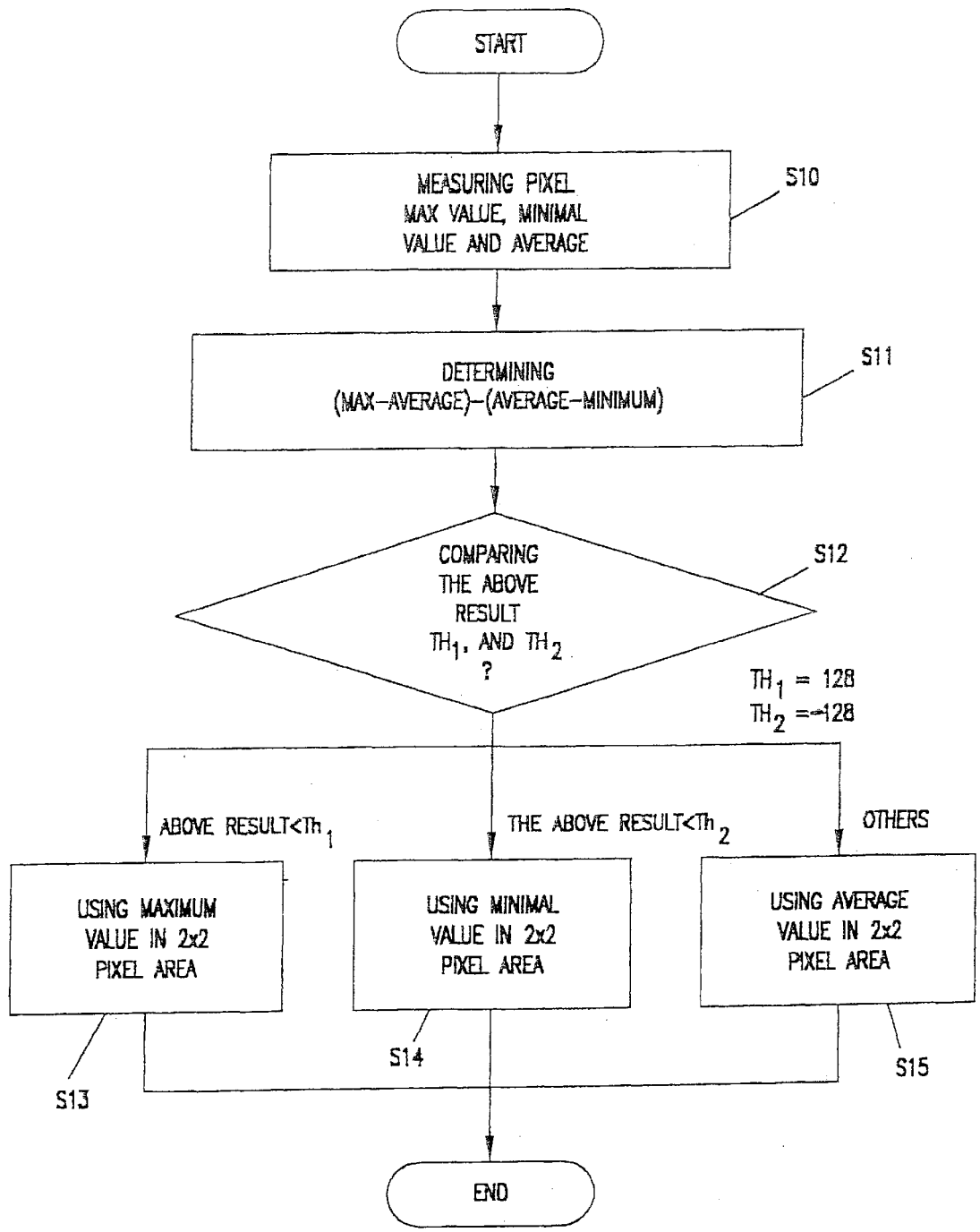
FIG. 4 is a flow chart illustrating steps involved in a preferred process of selecting a criterion to generate the low-resolution layers according to the current invention.

FIG. 4 is a flow chart illustrating steps involved in a preferred process of selecting a criterion to generate the low-resolution layers according to the current invention. In general, to reduce the resolution of a block, an average pixel value of the block is used, and the average value is placed in the reduced block. However, this technique is not suitable for ordinary textual or diagrammatic images where only a small portion of the image area has a different pixel value. For example, images contain a diagram in black on a white background. If the above described averaging technique is used to generate a reduced image from the black and white diagram, the black diagram image portions usually fade and lose the contrast in the reduced image. For this reason, for the black on white background image, a minimal or darkest pixel value of a block is placed on a reduced image block. Similarly, for the white on black background image, a maximal or lightest pixel value of a block is placed on a reduced image block. In order to select a criterion for determining a pixel value in a reduced image, the following steps are taken in a preferred process of selecting a criterion to generate the low-resolution layers according to the current invention.

Still referring to FIG. 4, to select a way to reduce an image, a calculated value is compared to a predetermined set of threshold values. In step S10, within a given block of an image, a maximal value, a minimal value and an average value are determined. Based upon the above values, a value is calculated based upon the following equation, (the max value–the average value)–(the average value–the minimal value) in step S11. The above calculated value from the step S11 is compared to a predetermined set of threshold values Th1 and Th2 in step S12. One exemplary set of threshold values is Th1=128 and Th2=–128 for a pixel value ranging from 0 to 255. If the calculated value is smaller than Th1, then the maximal pixel value in the block is adapted in step S13. In this case, the block image is assumed to contain a white image on a black background. If the calculated value is smaller than Th2, then the minimal pixel value in the block is adapted in step S14. In this case, the block image is assumed to contain a black image on a white background. Lastly, for all other situations, the average pixel value in the block is adapted in step S15. In this case, the block image is assumed to contain an image other than the contrasted images.

Figure 5A:
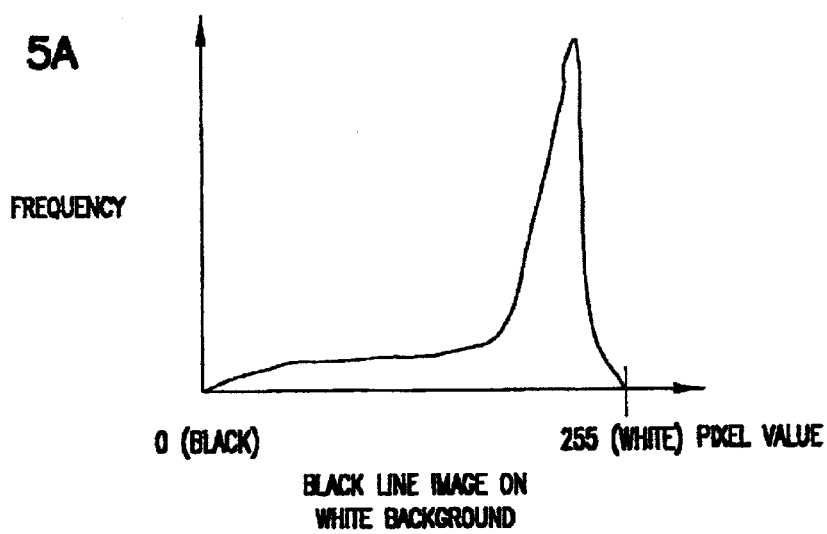
FIGS. 5(a) (b) and (c) illustrate exemplary distributions of pixel values across the black-and-white spectrum.
Figure 5B:
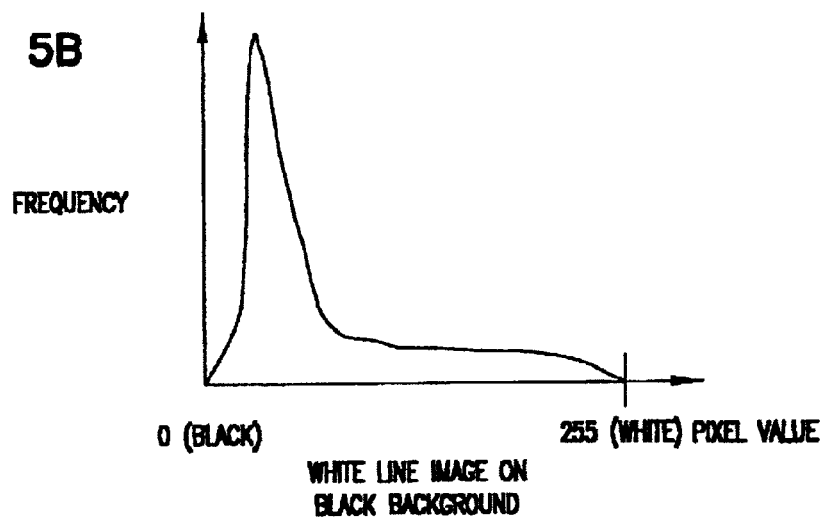
Figure 5C:
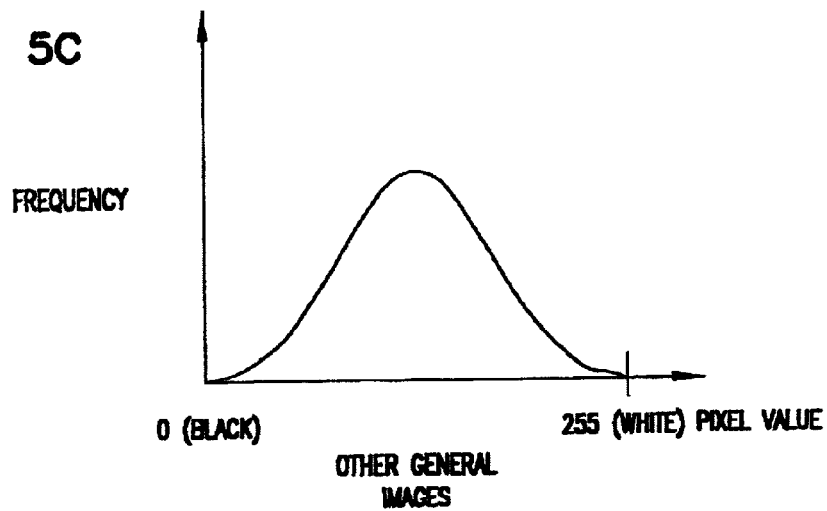

To further illustrate a basis for the above described selection, diagrams in FIG. 5 illustrate distributions of pixel values across the black-and-white spectrum. FIG. 5(a) illustrates the distribution of pixel values for a black image on a white background. The pixel value distribution is skewed toward the maximal or white value of 255. On the other hand, FIG. 5(b) illustrates the distribution of pixel values for a white image on a black background. The pixel value distribution is skewed toward the minimal or black value of 0. For all other non-contrasted images, the pixel value distribution is centered and bell-curved as shown in FIG. 5(c).

Figure 6:
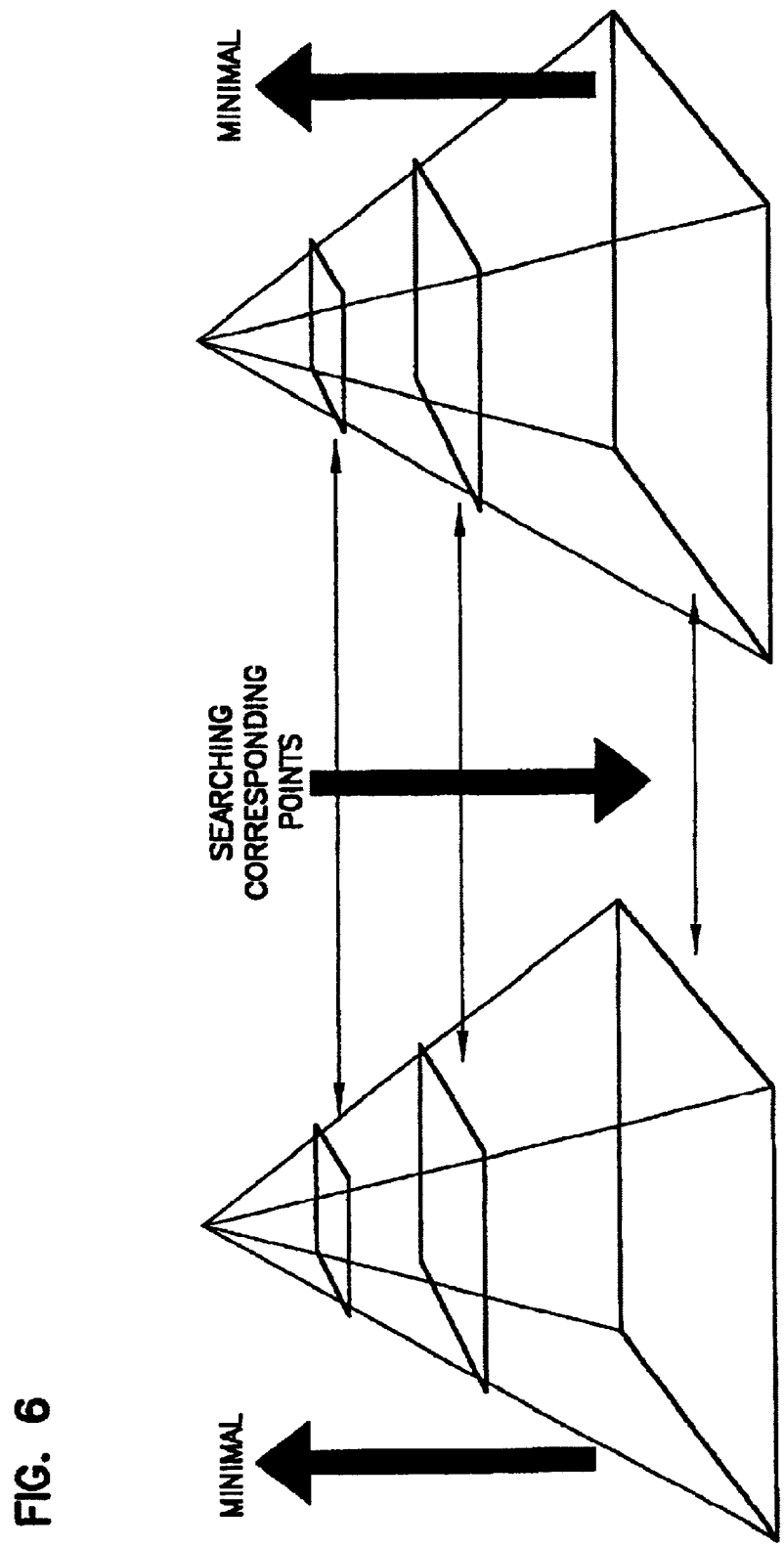
FIG. 6 illustrates directions for generating and processing the layers in the pyramidal data structures.

Now referring to FIG. 6, after the pyramid data structure is generated for each partially overlapping image in an upward direction as indicated by a first arrow, a pair of reduced images are compared to find a best match position in a downward direction as indicated by a second arrow. In particular, normalized correlation coefficients for pixel values are determined by moving two reduced low-resolution images with each other in parallel. Two pixel values $I_o1$ and $I_o2$ of the reduced images at a position (i, j) are respectively designated as $I_o1(i, j)$ and $I_o2(i, j)$. The normalized correlation coefficient(s) C for the two pixel values $I_o1(i, j)$ and $I_o2(i, j)$ is expressed in the following equation [2]:

$$C(x, y) = \frac{\Sigma_{k,l} I_o1(k, l) I_o2(k - x, l - y)}{\Sigma_{k,l} I_o1(k, l)^2 \Sigma_{k,l} I_o2(k - x, l - y)^2} \quad [2]$$

where (x, y) is an amount of moving two reduced low-resolution images with each other in parallel and the summation is taken over (k, l) where $I_o1(k, l)$ and $I_o2(k-x, l-y)$ are within the same image. When C(x, y) is the maximal, the position (x, y) is designated as (x0, y0).

Using a first image as a standard, a second image is to be modified. A position (i, j) in the first image is to be transformed into a position (f(i, j), g(i, j)) in the second image where f and g are transformation functions. Furthermore, the approximated positional transformation functions f and g are expressed by the following equation [3]:

$$f(i, j) = i - x0$$

$$g(i, j) = j - y0 \quad [3]$$

In other words, the parallel movement amount is determined by moving the two images in parallel only.

Using the above determined positional transformation functions and another data layer below the current data layer in the pyramid data structure, a more closely approximated normalized correlation coefficient(s) C is determined. Generally speaking, as shown in the flow chart in FIG. 2, starting with a minimal layer, an amount of optimal parallel movement is determined within a predetermined range of movements for each divided block in a layer. Each of the above determined parallel block movements is regarded as movement due to perspective transformation and is approximated by a polynomial. More specifically, for example, each of the two inputted images is dived into 16-by-16 blocks. For each block, the normalized correlation coefficient(s) C of the Equation [2] is determined by relatively moving the two images. The summation (k, l) is taken within a block, and the range of the movement for maximizing the normalized correlation coefficient(s) C is within ±8 pixels from the position where the normalized correlation coefficient(s) C is maximized for the entire image using the Equation [3].

However, since the previously determined (x0, y0) is a position on the ½ reduced image, the position (2x0, 2y0) is used for the current layer.

Furthermore, for each block, a position (x, y) for maximizing the normalized correlation coefficient(s) C is determined and is stored. For the Nth block, a position to maximize the normalized correlation coefficient(s) C is designated as (xshiftN, yshiftN). The parallel movement per block is approximated by a polynomial. That is, assuming the central position of the Nth block on the first image to be (pN, qN), the matching position for each block had been conventionally approximated as follows based upon the Equation [1] of perspective transformation:

$$xshift_N \approx \frac{c0p_N + c1q_N + c2}{c6p_N + c7q_N + 1} \quad [4]$$

$$yshift_N \approx \frac{c3p_N + c4q_N + c5}{c6p_N + c7q_N + 1}$$

The above Equation [4] is a non-linear approximated equation for the parameters c0 through c7, and complex iterative calculation is necessary for the least squares method.

According to the preferred process of the current invention, in order to speed up the process, a linear least squares method is used. That is, assuming that the both sides of the Equations [4] are equal, the least square solutions for the parameters c0 through c7 are determined based upon the following approximated equations [5] after the denominator (c6pN+c7qN+1) is manipulated.

$$xshift_N \approx c0p_N + c1q_N + c2 - c6p_N xshift_N - c7q_N xshift_N$$

$$yshift_N \approx c3p_N + c4q_N + c5 - c6p_N yshift_N - c7q_N yshift_N \quad [5]$$

If $p_N$ xshift$_N$, $q_N$ xshift$_N$, $p_N$ yshift$_N$ and $q_N$ yshift$_N$ are measured values, since it is a linear approximation equation for the parameters c0 through c7, the least square solutions are obtained by general matrix manipulations. The least square solutions based upon the first image are used as modified parameters for a second image. In the above example, only two layers are generated from the inputted image in the pyramidal data structure.

The preferred process according to the current invention is applicable to a plurality of layers in the pyramidal data structure. The preferred process starts with the least or lowest resolution layer, and the amount of parallel movement is approximated by an approximated equation for parallel movements having the lowest degree of freedom. A next approximated parallel movement is refined for a next layer in the pyramidal data structure within a predetermined range of area from the center determined by the approximated equation of the previous layer. The approximation is now made by equations of higher degree of freedom such as rotation, a rigid body transformation with compression as expressed in the following equation [6] and affine transformation as expressed in the following equation [7].

$$xshift_N \approx c0p_N + c1q_N + c2$$

$$yshift_N \approx c1p_N + c0q_N + c3 \quad [6]$$

$$xshift_N \approx c0p_N + c1q_N + c2$$

$$yshift_N \approx c3p_N + c4q_N + c5 \quad [7]$$

After determining the parallel movement amount for each block using the above Equation [6] or [7], the overall parallel movement amount is approximated by the Equation [5], and the parameters for perspective transformation are determined based upon the overall parallel movement amount. Any combination of the Equations [6] and [7] is used for different layers. The use of the approximation equations with a high degree of freedom substantially reduces the processing time of the high-resolution data layers in the pyramidal data structure. The use of the approximation equations with a high degree of freedom also accurately determines the perspective transformation parameters.

Finally, using the parameters, one of the two images undergoes perspective transformation, and the pair of the images is composed into a single image. For the value of a pixel that corresponds in multiple input images, the composed image adopts a pixel value from one of the input images. In the alternative, using a predetermined weight which varies as the position nears an edge, a summation of the products between the pixel value and the variable weight is adopted as a pixel value in the composed image. The above alternative method enables a smooth transition between the composed images. The composed image data is outputted.

Figure 7:
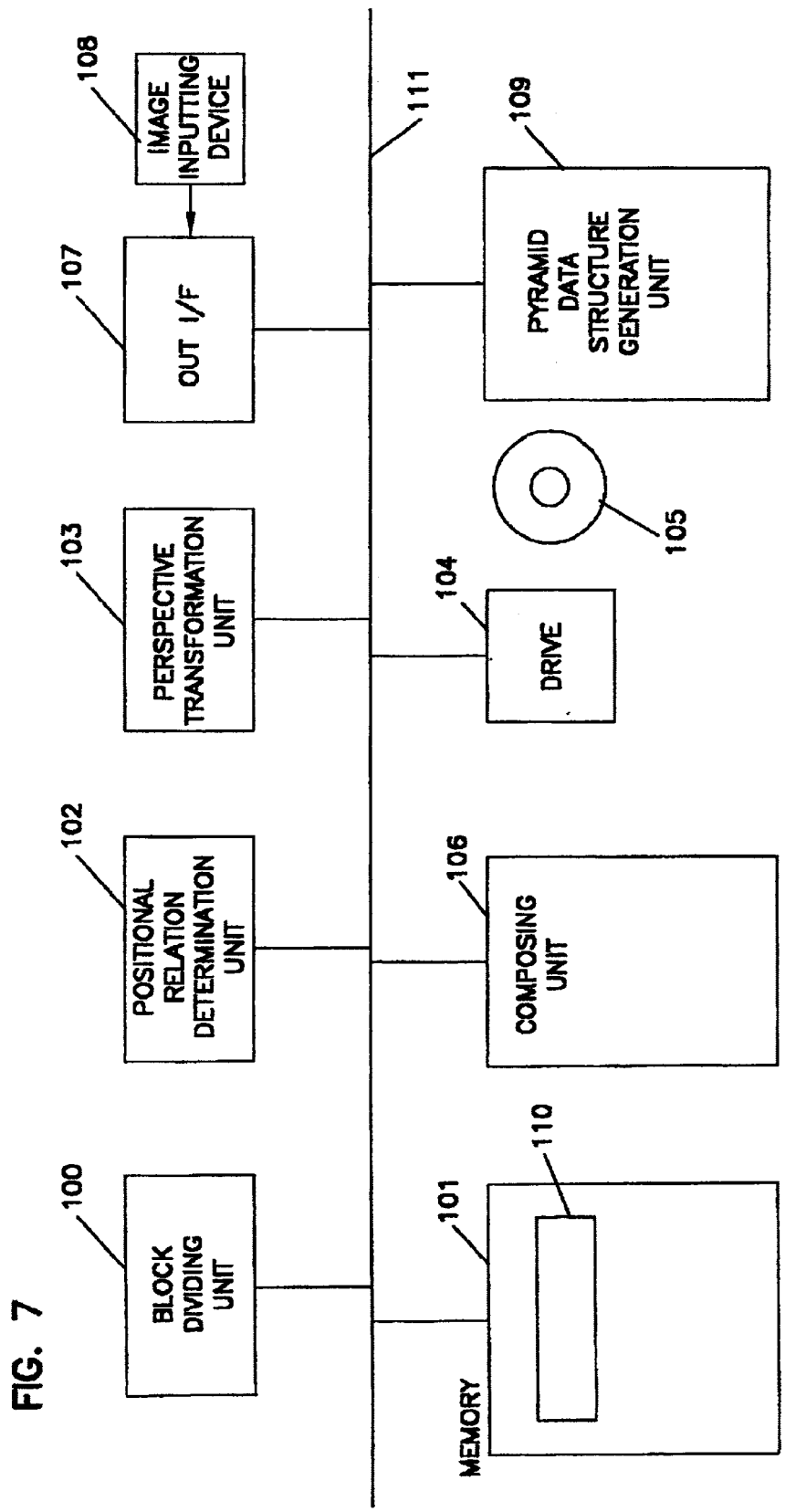
FIG. 7 is a diagram illustrating one preferred embodiment of the system of determining perspective transformation parameters according to the current invention.

Now referring to FIG. 7, a diagram illustrates one preferred embodiment of the system of determining perspective transformation parameters according to the current invention. An image inputting device 108 such as a digital camera captures partially overlapping images of a common object and inputs the partially overlapping image data via an out I/F interface 107 and a network or data bus 111. The inputted images are stored at least in a memory unit 101 for further processing. Based upon the inputted partially overlapping images, a pyramidal data structure generation unit 109 generates a pyramidal data structure for each inputted overlapping image. Each pyramidal data structure contains a predetermined number of layers of data, and each layer represents the partially overlapping image at a predetermined resolution. In generating the pyramidal data structure, a block dividing unit 100 divides the image into a predetermined number of blocks. A positional relation determination unit 102 also uses the divided image blocks to determine a parallel movement amount to match the divided blocks as well as the entire image. Based upon the above determined parallel movement amount, a perspective transformation unit 103 determines a predetermined set of perspective transformation parameters. A composing unit 106 composes the partially overlapping images into a single image after the partially overlapping images are corrected by perspective transformation. The resulted composed image is stored on a disk storage medium 105 via a disk drive 104 or in a memory unit 101 for later retrieval. Alternatively, the initial overlapping images is inputted into the memory unit 101 from the disk storage medium 105 or from any other communication lines including the Internet.

Figure 8:
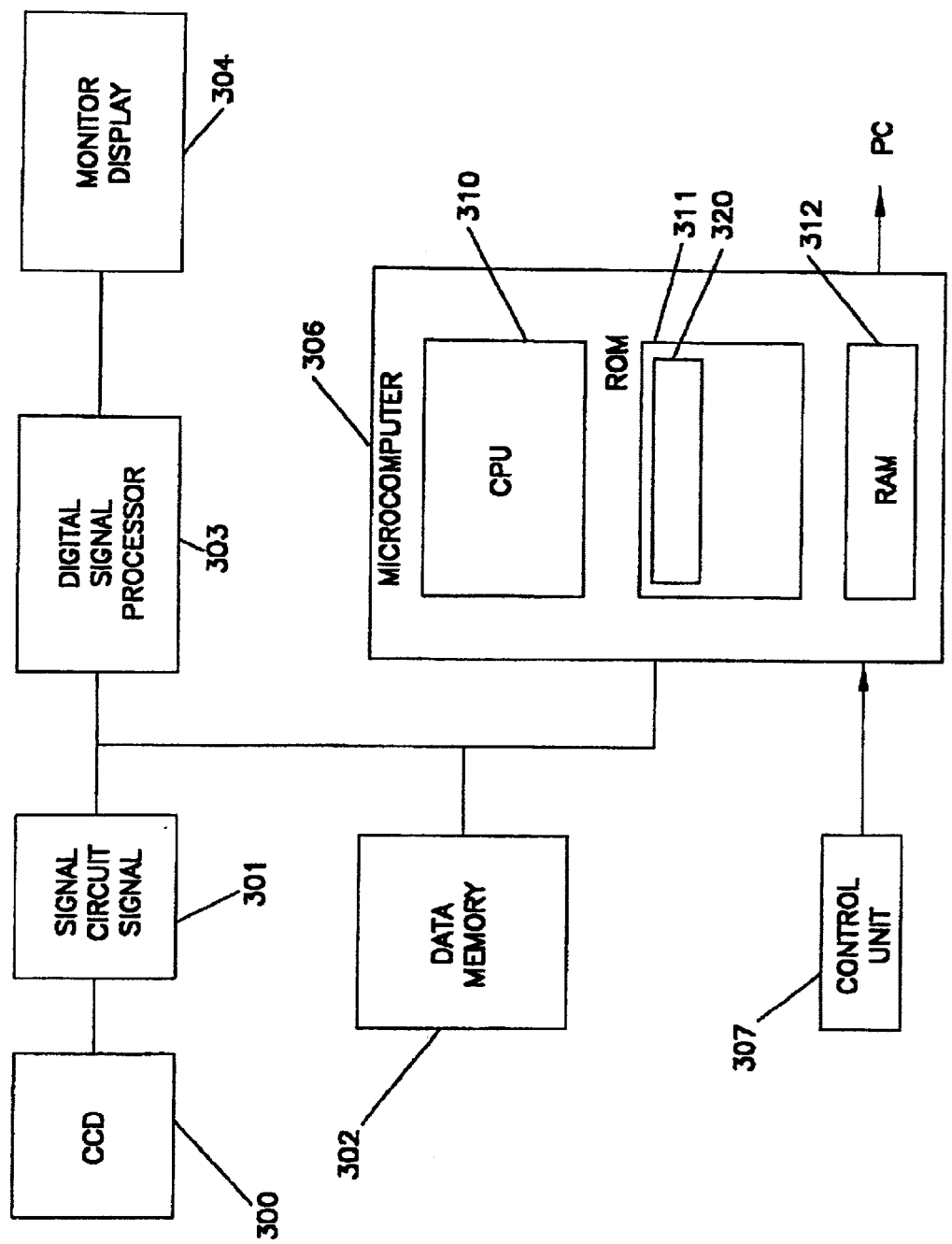
FIG. 8 is a diagram illustrating a second preferred embodiment of the system of determining perspective transformation parameters according to the current invention.

Now referring to FIG. 8, a diagram illustrates a second preferred embodiment of the system of determining perspective transformation parameters according to the current invention. The second embodiment includes the entire system within an image capturing device such as a digital camera. The second preferred embodiment includes an image capturing unit 300 such as a CCD image sensor for generating an analog image signal and a signal circuit unit 301 for digitizing the image signal. Furthermore, the second preferred embodiment includes a digital signal processor 303 for processing the digital signal for compression and decompression as well as converting the digital signal to a video signal. The input and output units of the second preferred embodiment include a display monitor 304 for displaying the output composed image and a control unit 307 for controlling a microcomputer 306. The microcomputer 306 includes a central processing (CPU) unit 310, a read only memory (ROM) unit 311 and a random access memory (RAM) unit 312. The microcomputer 306 is also connected to a data memory unit 302.

Still referring to FIG. 8, the second preferred embodiment operates in the following manner. When a user does not manually activate the control unit 307, the digital processor 303 continually processes the input image and outputs to the monitor display 304 so that the user sees the image within the visual field of the CCD 300. Upon activating the control unit 307, an input image from the signal circuit 301 is temporarily stored in the data memory 302. After the digital signal processor 303 compresses the same inputted image via a predetermined technique such as gradation, the compressed image is stored in the data memory 302. If the control unit 307 indicates that the compressed image is to be outputted to an external PC via the microcomputer 306, the digital signal processor 303 decompresses the compressed image in the data memory unit 302, and the decompressed image is stored back in the data memory 302. The above described operations are also controlled by executing a software program 320 that is stored in the ROM 311. The software 320 also controls the process of determining perspective transformation parameters and composing a single image from partially overlapping images according to the current invention.

The CPU 310 executes computer instructions to perform tasks for determining perspective transformation parameters and composing a single image from partially overlapping images according to the control software 320. The initial task includes that at least two decompressed or original partially overlapping images are placed in the data memory unit 302. One way to accomplish this initial task is to sequentially sending the compressed images to the digital signal processor 303 and decompress a single compressed image at a time for returning it to the data memory unit 302. If non-compressed images are sequentially captured, these images are stored in the data memory unit 302. Then, based upon the image characteristic of the partially overlapping images, the control software 320 determines a selective criterion for generating low resolution images for the pyramidal structure. Predetermined selection criteria include a minimal pixel value, a maximal pixel value or an average pixel value in selecting a pixel value in a low resolution image. The details of the selection techniques or criteria have been discussed with respect to FIG. 4. Based upon the selected pixel value determination technique, low resolution data layers of the pyramidal data structure is generated for each partially overlapping image. The pyramidal data structure is temporarily stored in memory such as RAM 312.

The CPU 310 further executes the control program 320 to perform the tasks for determining parallel movement necessary to match the partially overlapping images as well as for determining perspective transformation parameters based upon the parallel movement. The details of these tasks have been described with respect to FIG. 2. Finally, the CPU 310 executes remaining instructions in the software 320 to compose the partially overlapping images into a single image while performing perspective transformation on at least one of the partially overlapping images. The digital signal processor 303 optionally compresses the composed image and stores the compress data in the data memory unit 302. Upon completion of the above described tasks, the digital signal processor 303 also sends a signal to the monitor display 304 so that the user is informed of the completion of the composition of the partially overlapping images. To output the composed image to an external PC, the user inputs an external output signal to do so via the control unit 307. In response to the external output signal, the digital signal processor 303 again decompresses the compressed composed data and stores the decompressed data in the data memory unit 302 before outputting to an external PC via the microcomputer 306.

In alternative embodiments, a digital signal processor 303 performs some or all of the tasks that the microcomputer 306 performs. In addition, the data memory unit 302 holds the data in non-compressed format all the time in an alternative embodiment without the compression and decompression steps. In another alternative embodiment, the compressed composed image data is outputted to an external PC upon demand.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of composing partially overlapping images, comprising:

inputting partially overlapping images of at least a common object;

dividing at least two of the overlapping images into a predetermined number of blocks;

determining a positional relation between a corresponding pair of the blocks in the two overlapping images based upon following equations, $$xshift_N \approx \frac{c0 p_N + c1 q_N + c2}{c6 p_N + c7 q_N + 1}$$

where c0 through c7 are perspective parameters, $$yshift_N \approx \frac{c3 p_N + c4 q_N + c5}{c6 p_N + c7 q_N + 1}$$

$xshift_N$ and $yshift_N$ are perspective transformation parameters, and $p_N$ and $q_N$ are positional coordinates;

determining the perspective transformation parameters based upon the positional relation and an approximation for the above equations, the approximation being $xshift_N \approx c0 p_N + c1 q_N + c2 - c6 p_N xshift_N - c7 q_N xshift_N$; and $yshift_N \approx c3 p_N + c4 q_N + c5 - c6 p_N yshift_N - c7 q_N yshift_N$ composing the overlapping images according to perspective transformation based upon the perspective transformation parameters.

2. The method of composing partially overlapping images according to claim 1 wherein the positional relation is determined based upon an amount of parallel movement necessary to match the corresponding pair of the blocks.

3. The method of composing partially overlapping images according to claim 1 wherein the positional relation is determined based upon affine transformation.

4. The method of composing partially overlapping images according to claim 1 wherein the positional relation is determined based upon correlational coefficients representing the overlapping images.

5. The method of composing partially overlapping images according to claim 1 wherein the perspective transformation parameters are determined based upon a method of least squares.

6. The method of composing partially overlapping images according to claim 1 wherein the inputted partially overlapping images are organized into a pyramidal data structure having a predetermined number of hierarchical layers prior to said dividing at least two of the overlapping images, the hierarchical layers including at least a minimal layer and a maximal layer, said determining the positional relation being sequentially refined from the minimal layer to the maximal layer.

7. The method of composing partially overlapping images according to claim 6 wherein the pyramidal data structure is generated by selecting one of a predetermined set of criteria for reducing information from the maximal layer towards the minimal layer.

8. The method of composing partially overlapping images according to claim 7 wherein the one of the criteria is selected based upon pixel value characteristic of the overlapping images.

9. The method of composing partially overlapping images according to claim 8 wherein the pixel value characteristics include a black-pixel image on a white background and a white pixel image on a black background.

10. A system for composing partially overlapping images, comprising:

an image input unit for inputting partially overlapping images of at least a common object;

a block dividing unit connected to said image input unit for dividing at least two of the overlapping images into a predetermined number of blocks;

a positional relation determination unit connected to said block dividing unit for determining a positional relation between a corresponding pair of the blocks in the two overlapping images based upon following equations, $$xshift_N \approx \frac{c0 p_N + c1 q_N + c2}{c6 p_N + c7 q_N + 1}$$

where c0 through c7 are perspective parameters, $$yshift_N \approx \frac{c3 p_N + c4 q_N + c5}{c6 p_N + c7 q_N + 1}$$

$xshift_N$ and $yshift_N$ are perspective transformation parameters, and $p_N$ and $q_N$ are positional coordinates;

a perspective transformation parameter determination unit connected to said positional relation determination unit for determining the perspective transformation parameters based upon the positional relation and an approximation for the above equations, the approximation being $xshift_N \approx c0 p_N + c1 q_N + c2 - c6 p_N xshift_N - c7 q_N xshift_N$ $yshift_N \approx c3 p_N + c4 q_N + c5 - c6 p_N yshift_N - c7 q_N yshift_N$;

and a composing unit connected to said perspective transformation parameter determination unit for composing the overlapping images according to perspective transformation based upon the perspective transformation parameters.

11. The system for composing partially overlapping images according to claim 10 wherein said positional relation determination unit determines an amount of parallel movement necessary to match the corresponding pair of the blocks.

12. The system for composing partially overlapping images according to claim 10 wherein said positional relation determination unit determines the positional relation based upon affine transformation.

13. The system for composing partially overlapping images according to claim 10 wherein
said positional relation determination unit determines the positional relation based upon correlational coefficients representing the overlapping images.

14. The system for composing partially overlapping images according to claim 10 wherein said perspective transformation parameter determination unit determines the perspective transformation parameters based upon a method of least squares.

15. The system for composing partially overlapping images according to claim 10 further comprising a pyramidal data structure generation unit connected to said image input unit for generating a pyramidal data structure having a predetermined number of hierarchical layers based upon the inputted partially overlapping images, the hierarchical layers including at least a minimal layer and a maximal layer, said positional relation determination unit sequentially refining the positional relation from the minimal layer to the maximal layer.

16. The system for composing partially overlapping images according to claim 15 wherein said pyramidal data structure generation unit generates the pyramidal data structure by selecting one of a predetermined set of criteria for reducing information from the maximal layer towards the minimal layer.

17. The system for composing partially overlapping images according to claim 16 wherein said pyramidal data structure generation unit selects the one of the criteria based upon pixel value characteristic of the overlapping images.

18. The system for composing partially overlapping images according to claim 17 wherein the pixel value characteristics include a black-pixel image on a white background and a white-pixel image on a black background.

19. A storage medium storing computer executable instructions for composing partially overlapping images, the computer executable instructions performing the steps of:
inputting partially overlapping images of at least a common object;
dividing at least two of the overlapping images into a predetermined number of blocks;
determining a positional relation between a corresponding pair of the blocks in the two overlapping images based upon following equations, $$xshift_N \approx \frac{c0p_N + c1q_N + c2}{c6p_N + c7q_N + 1}$$

$$yshift_N \approx \frac{c3p_N + c4q_N + c5}{c6p_N + c7q_N + 1};$$

where c0 through c7 are perspective parameters, $xshift_N$ and $yshift_N$ are perspective transformation parameters, and $p_N$ and $q_N$ are positional coordinates; and
determining the perspective transformation parameters based upon the positional relation and an approximation for the above equations, the approximation being $$xshift_N \approx c0p_N + c1q_N + c2 - c6p_N xshift_N - c7q_N xshift_N$$

$$yshift_N \approx c3p_N + c4q_N + c5 - c6p_N yshift_N - c7q_N yshift_N;$$

and
composing the overlapping images according to perspective transformation based upon the perspective transformation parameters.

20. The storage medium storing computer executable instructions according to claim 19 wherein the perspective transformation parameters are determined based upon a method of least squares.

21. The storage medium storing computer executable instructions according to claim 19 wherein the inputted partially overlapping images are organized into a pyramidal data structure having a predetermined number of hierarchical layers prior to said dividing at least two of the overlapping images, the hierarchical layers including at least a minimal layer and a maximal layer, said determining the positional relation being sequentially refined from the minimal layer to the maximal layer.

22. The method of composing partially overlapping images according to claim 1 where the approximation is made as follows:

$$xshift_N \approx c0p_N + c1q_N + c2$$

$$yshift_N \approx c1p_N + c0q_N + c3.$$

23. The method composing partially overlapping images according to claim 1 wherein the approximation is made as follows:

$$xshift_N \approx c0p_N + c1q_N + c2$$

$$yshift_N \approx c3p_N + c4q_N + c5.$$

24. The system for composing partially overlapping images according to claim 10 wherein the approximation is made as follows:

$$xshift_N \approx c0p_N + c1q_N + c2$$

$$yshift_N \approx c1p_N + c0q_N + c3.$$

25. The system for composing partially overlapping images according to claim 10 wherein the approximation is made as follows:

$$xshift_N \approx c0p_N + c1q_N + c2$$

$$yshift_N \approx c3p_N + c4q_N + c5.$$

26. The storage medium storing computer executable instructions according to claim 19 wherein the approximation is made as follows:

$$xshift_N \approx c0p_N + c1q_N + c2$$

$$yshift_N \approx c1p_N + c0q_N + c3.$$

27. The storage medium storing computer executable instructions according to claim 19 wherein the approximation is made as follows:

$$xshift_N \approx c0p_N + c1q_N + c2$$

$$yshift_N \approx c3p_N + c4q_N + c5.$$

* * * * *